United States Patent [19]
Kimura et al.

[11] Patent Number: 5,607,997
[45] Date of Patent: Mar. 4, 1997

[54] ROOM TEMPERATURE CURABLE ORGANOPOLYSILOXANE COMPOSITION

[75] Inventors: Tsuneo Kimura; Yoshio Inoue, both of Matsuida-machi, Japan

[73] Assignee: Shin-Etsu Chemical Co., Ltd., Tokyo, Japan

[21] Appl. No.: 540,883

[22] Filed: Oct. 11, 1995

[30] Foreign Application Priority Data

Oct. 13, 1994 [JP] Japan .................................. 6-274553
Oct. 21, 1994 [JP] Japan .................................. 6-282780

[51] Int. Cl.$^6$ .................................................... C08K 3/34
[52] U.S. Cl. ...................... 524/493; 524/789; 523/212; 523/213; 528/33; 528/34
[58] Field of Search ............... 528/33, 34; 524/789, 524/493; 523/212, 213

[56] References Cited

U.S. PATENT DOCUMENTS 3,708,467  1/1973  Smith, Jr. et al. ........................ 528/34
5,486,589  1/1996  Inoue ........................................ 528/33

*Primary Examiner*—Melvyn I. Marquis
*Attorney, Agent, or Firm*—Oblon, Spivak, McClelland, Maier & Neustadt, P.C.

[57] ABSTRACT

This composition comprises (A) a diorganopolysiloxane terminated with hydroxyl groups at both ends of its molecular chain having a viscosity of 25 to 1,000,000 cSt at 25° C., (B) a low molecular weight organosilane or straight chain organosiloxane having silanol groups, such as $HO(Me_2SiO)H$, $Me_3SiO[Me(OH)SiO]_2SiMe_3$ or mixtures thereof, (C) a hydrolyzable silane, and (D) a silica filler having a specific surface area of 50 m$^2$/g or more. The composition has good non-flowability and exhibits good application workability when surface-finishing with spatula, and therefore is useful as building sealing materials.

9 Claims, No Drawings

ROOM TEMPERATURE CURABLE ORGANOPOLYSILOXANE COMPOSITION

BACKGROUND OF THE INVENTION

1. Field of the Invention

The present invention relates to a room temperature curable organopolysiloxane composition, and more particularly to a room temperature curable organopolysiloxane composition useful as building sealing materials and the like.

2. Description of the Prior Art

In a filling application to the joint portions of concretes and sashes, the peripheral portions of glasses, and the like, there are generally used sealing materials such as synthetic rubbers. Conventionally known sealing materials include various materials, such as silicones, polysulfides, polyurethanes, acryl resins, SBR, and butyl rubbers, among which silicone sealing materials are widely used from the view point of excellent adhesion, resistance to heat and weatherability, and durability. The silicone sealing material, which is generally charged in a cartridge, is filled in portions to be applied, such as joints, and the filled portions are surface-finished with a spatula or the like, followed by curing. In that case, the sealing material is required to have non-flowability and good application workability. In order to satisfactorily improve the non-flowability and the application workability, it is necessary to add a large amount of silica fillers and to blend the resulting composition. However, since a blender used undertakes a very large load when blending, it brings the disadvantages that productivity decreases, that in an extreme case, the production comes to be impossible, and that the characteristics of a cured sealing material obtained by curing become poor. Also, there is known a silicone rubber composition to which boric acid or alkyl borate has been added in order to improve the flowability of a silicone composition [Japanese Patent Publication (kokoku) No. 39-22438]. This composition, however, has the drawbacks that a satisfactory effect can not be obtained unless the composition is heat-treated, and that its curing reaction may be inhibited.

Further, there is known a silicone rubber composition prepared by adding to a composition made up of a liquid organopolysiloxane and a hydrophobic silica, an organic liquid having a vapor pressure equal to or more than a specific value [Japanese Patent Publication (kokoku) No. 49-5510]. However, this composition is disadvantageous in that the organic liquid used has flammability, volatility or toxity.

Furthermore, there is known a method for improving the flowability of a silicone rubber composition by adding a polyether composition to a silicone rubber. However, the silicone rubber composition obtained by this method has the drawbacks that the composition can not be readily applied. Especially when surface-finishing is performed with a spatula, the spatula can be detached with difficulty, causing stringing.

SUMMARY OF THE INVENTION

An object of the present invention is to provide a room temperature curable organopolysiloxane, which does not cause flowing and dropping when filling in portions to be applied; keeps good application workability, such as good detachability, when surface-finishing; and further has excellent sealing properties, thus being useful as, for example, sealing materials.

The present inventors have earnestly studied to find that the non-flowability and good application workability of a silicone rubber composition are related closely to the wettability of the surface of a silica filler to a silicone oil, both of which are contained in the composition, and in order to increase the wettability, it is effective to add a low molecular weight straight chain organosiloxane having silanol groups; and that the straight chain organosiloxane does not degrade the physical properties of a silicone rubber obtained by curing the composition. Thus, the present invention has been accomplished.

More specifically, the present invention is a room temperature curable organopolysiloxane composition comprising:

(A) a diorganopolisiloxane terminated with a hydroxyl group at both ends of its molecular chain having a viscosity of 25 to 1,000,000 cSt at 25° C., represented by the following general formula (1):

$$HO(RR'SiO)_pH \qquad (1)$$

wherein R and R', which may be the same or different, are each a unsubstituted or substituted monovalent hydrocarbon group, and P is an integer of 10 or more;

(B) at least one compound selected from the group consisting of organosilanes and straight chain organosiloxanes represented by the following general formula (2):

$$HO(R^1R^2SiO)_LH \qquad (2)$$

wherein $R^1$ and $R^2$, which may be the same or different, are each a unsubstituted or substituted monovalent hydrocarbon group, and L is an integer of 1 to 5, and a straight chain organosiloxane represented by the following general formula (3):

$$(R^3)_3SiO(R^1R^2SiO)_M[R^1Si(OH)O]_NSi(R^3)_3 \qquad (3)$$

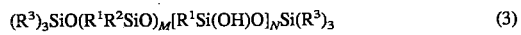

wherein $R^1$ and $R^2$ are as defined above, $R^3$ is a unsubstituted or substituted monovalent hydrocarbon group, N is an integer of 2 to 5, and M is 0 or a positive integer provided that M+N equals to 2 to 5;

(C) a hydrolyzable silane represented by the following general formula (4):

$$(R^4)_ASiX_{(4-A)} \qquad (4)$$

wherein $R^4$ is a unsubstituted or substituted monovalent hydrocarbon group, X is a hydrolyzable group, and A is 0 or 1; and (D) a silica filler having a specific surface area of 50 m²/g or more.

The composition according to the present invention does not cause flowing and dropping when filling in portions to be applied; keeps good application workability, such as good detachability, when surface-finishing; and further has excellent sealing properties, thus being useful as, for example, sealing materials.

DETAILED DESCRIPTION OF THE PREFERRED EMBODIMENTS

The present invention is hereinafter described in more detail.

Diorganopolysiloxane of the component (A)

The component (A) used in the present invention, a diorganopolisiloxane terminated with a hydroxyl group at both ends of its molecular chain, is represented by the following general formula (1):

$$HO(RR'SiO)_P H \tag{1}$$

In the formula (1), R and R' are each a unsubstituted or substituted monovalent hydrocarbon group having 1 to 10 carbon atoms, preferably 1 to 8 carbon atoms, exemplified by alkyl groups such as methyl, ethyl, propyl and butyl groups; cycloalkyl groups such as cyclohexyl group; alkenyl groups such as vinyl and allyl groups; aryl groups such as phenyl and tolyl groups; aralkyl groups such as benzyl and phenylethyl groups; and groups derived from the above groups by the substitution of at least part of the hydrogen atoms bonded to the carbon atoms of the above groups with halogen atoms, cyano groups or the like, such as chloromethyl, trifluoropropyl and cyanoethyl groups. Out of these, preferred are methyl, phenyl and 3,3,3-trifluoropropyl groups, and especially preferred is the methyl group.

In the formula (1), P is an integer of 10 or more, preferably 10 to 2,000. The diorganopolysiloxane has a viscosity of 25 to 1,000,000 cSt, preferably 1,000 to 100,000 cSt, at 25° C.

Organosilane or straight chain organosiloxane of the component (B)

The component (B) used in the present invention is at least one compound selected from the group consisting of an organosilane or straight chain organosiloxane represented by the following general formula (2):

$$HO(R^1R^2SiO)_L H \tag{2},$$

and a straight chain organosiloxane represented by the following general formula (3):

$$(R^3)_3SiO(R^1R^2SiO)_M[R^1Si(OH)O]_N Si(R^3)_3 \tag{3}.$$

In the formulas (2) and (3), the unsubstituted or substituted monovalent hydrocarbon group represented by $R^1$, $R^2$ or $R^3$ may be the same as the unsubstituted or substituted monovalent hydrocarbon group represented by R or R' in the above general formula (1). $R^1$, $R^2$ and $R^3$ are preferably methyl, phenyl, trifluoropropyl and vinyl groups, more preferably the methyl group. L is an integer of 1 to 5, N is an integer of 2 to 5, and M is 0 or a positive integer provided that M+N equals to 2 to 5.

Specific examples of the organosilane or straight chain organosiloxane, which is low in molecular weight and has silanol groups, represented by the above general formula (2), include, for example, dihydroxydimethylsilane, dihydroxymethylvinylsilane, dihydroxymethylphenylsilane, dihydroxymethyl-3,3,3-trifluoropropylsilane, dihydroxydiphenylsilane, 1,3-dihydroxytetramethyldisiloxane, 1,5-dihydroxyhexamethyltrisiloxane, 1,7-dihydroxyoctamethyltetrasiloxane, 1,9-dihydroxydecamethylpentasiloxane, 1,3-dihydroxy-1,3-divinyl-1,3-dimethyldisiloxane and 1,5-dihydroxy-1,3,5-trivinyl-1,3,5-trimethyltrisiloxane.

Specific examples of the straight chain organosiloxane, which is low in molecular weight and has silanol groups, represented by the above general formula (3), include, for example, 2,3-dihydroxyoctamethyltetrasiloxane, 2,3-dihydroxy-2,3-divinylhexamethyltetrasiloxane and 2,3,4-trihydroxynonamethylpentasiloxane.

These organosilanes or straight chain organosiloxanes having a low molecular weight can be prepared readily by subjecting organoalkoxysilanes to hydrolysis in the presence of an ion-exchange resin.

These organosilanes and straight chain organosiloxanes of the component (B) can be used singly or in a combination of two or more thereof.

The component (B) acts as an agent for providing non-flowability to the composition.

The component (B) is formulated in an amount of preferably 0.1 to 10 parts by weight, more preferably 0.2 to 5 parts by weight, per 100 parts by weight of the component (A). If the amount is too small, the composition may be poor in non-flowability, while if the amount is too large, the composition may be lowered in storability.

Hydrolyzable silane of the component (C)

The component (C) used in the present invention is a hydrolyzable silane represented by the following general formula (4):

$$(R^4)_A SiX_{(4-A)} \tag{4}$$

In the formula (4), the unsubstituted or substituted monovalent hydrocarbon group represented by $R^4$ may be similar to the unsubstituted or substituted monovalent hydrocarbon group represented by R or R' in the above general formula (1). $R^4$ is preferably methyl, ethyl, phenyl, trifluoropropyl and vinyl groups, more preferably the methyl and phenyl groups. In the formula (4), the hydrolyzable group represented by X includes, for example, alkoxy groups such as methoxy, ethoxy and butoxy groups; ketoxime groups such as dimethyl ketoxime and methyl ethyl ketoxime groups; carboxyl groups such as acetoxy group; alkenyloxy groups such as isopropenyloxy and isobutenyloxy groups; amino groups such as N-butylamino and N,N-diethylamino groups; and amido groups such as N-methyl acetamido group. Further in the formula (4), A is 0 or 1.

As the hydrolyzable silanes represented by the above general formula (4), there can be suitably used any hydrolyzable silanes which are generally used in the condensation-curable silicone rubber compositions of this type. Specific examples of the hydrolyzable silane include, for example, methyltriacetoxysilane, vinyltriacetoxysilane, methyltributanoximesilane, vinyltributanoximesilane, methyltrimethoxysilane, vinyltrimethoxysilane, vinyltriethoxysilane, ethyl 2-trimethoxysilylpropionate, 2-ethylhexyl 2-trimethoxysilylpropionate, 2-ethylhexyl 2-methyldimethoxysilylpropionate, vinyltriisopropenoxysilane, phenyltriisopropenoxysilane and methyltributylaminosilane.

The component (C) is formulated in an amount of preferably 3 to 20 parts by weight, more preferably 5 to 15 parts by weight, per 100 parts by weight of the above component (A). If the amount is too small, the composition may be decreased in stability so that a phenomenon such as gelation is liable to occur during storage. If the amount is too large, a cured composition obtained by curing the composition may be increased in volume shrinkage so that the physical properties of the composition lowers after curing or the curing speed is down.

Silica filler of the component (D)

The component (D) used in the present invention is a silica filler having a specific surface area of 50 m²/g or more, preferably at least 100 m²/g, more preferably 100 to 400 m²/g.

Specific examples of the silica filler having a specific surface area of 50 m²/g or more include, for example, hydrophilic silicas obtained by high-temperature hydrolysis of silicon tetrachloride in oxyhydrogen flame, and hydrophobic silica obtained by surface-treatment of a hydrophilic silica with chlorosilane or silazane. These silica fillers may be used singly or in a combination of two or more thereof.

The component (D) acts as a reinforcing filler for providing non-flowability to the composition before curing as well as providing mechanical strength to the cured composition obtained by curing, by using this component in combination with the component (B).

The component (D) is formulated in an amount of preferably 1 to 500 parts by weight, more preferably 5 to 100 parts by weight, per 100 parts by weight of the component (A). If the amount is too small, the composition before curing may be provided with insufficient non-flowability, while if the amount is too large, the composition before curing may be decreased in discharge amount so that the workability of the composition is reduced.

Preparation of the composition

The composition of the present invention is obtained as a one-pack type room temperature curable composition by uniformly mixing predetermined amounts of the above components (A) to (D) in a dry atmosphere.

To the present composition, it is possible to add various compounds unless the flowability is inhibited. These compounds include, for example, condensation catalysts such as alkyltin ester compounds, e.g. dibutyltin diacetate, dibutyltin dilaurate and dibutyltin dioctoate, alkoxytitanium and titanium chelate compounds; reinforcing agents such as precipitated silica powder, quartz powder, carbon powder, talc and bentonite; fibrous fillers such as glass fibers, carbon fibers and organic fibers; basic fillers such as calcium carbonate, zinc carbonate, zinc oxide, magnesium oxide and celite; heat resistance improvers such as red oxide and cerium oxide; cold resistance improvers; dehydrating agents; anti-corrosive agents; adhesion improvers such as γ-glycidoxypropyltrimethoxysilane; and liquid reinforcing agents such as a network polysiloxane comprised of triorganosiloxy units and $SiO_2$ units. They can be added in a desired amount to the composition, if necessary.

EXAMPLES

The present invention will now be described in more detail. In the following, Me stands for the methyl group, and viscosity was measured at 25° C.

Example 1

An organopolysiloxane composition was prepared by mixing under water-free conditions:
  100.0 parts by weight of a dimethylpolysiloxane terminated with a hydroxyl group at both terminal ends having a viscosity of 20,000 cSt,
  1.0 part by weight of $HO(Me_2SiO)H$,
  10.0 part by weights by weight of a fumed silica having a specific surface area of 110 $m^2/g$ and the surface of which had been rendered hydrophobic by treatment,
  6.0 parts by weight of methyltributanoximesilane, and
  0.1 part by weight of dibutyltin dioctoate.

From the composition was prepared a sheet with a thickness of 2 mm, which was then left in an atmosphere of 20° C. and 55% RH for seven days, to form an elastomeric product. The product was examined for rubber properties [hardness, elongation (%)], and [tensile strength ($kgf/cm^2$)] to give the results given in Table 1. The hardness was measured using A type hardness tester. Slump was measured to examine non-flowability of the composition according to JIS-A-5758, and discharge rate was measured to examine processability. The results are given together in Table 1. Furthermore, to compare stringing characteristics, the composition was charged in a glass plate with an inner diameter of 27 mm and a depth of 15 mm so as to have a flat and smooth top surface. A disk with a diameter of 15 mm was brought into contact with the top surface of the composition, and then the disk was raised at a rate of 500 mm/min, whereupon the length of the resulting string was measured. The result is given in Table 1.

Example 2

An organopolysiloxane composition was prepared by mixing under water-free conditions:
  100.0 parts by weight of a dimethylpolysiloxane terminated with a hydroxyl group at both terminal ends having a viscosity of 20,000 cSt,
  1.0 part by weight of $HO(Me_2SiO)_2H$,
  10.0 parts by weight of a fumed silica having a specific surface area of 110 $m^2/g$ and the surface of which had been rendered hydrophobic by treatment,
  6.0 parts by weight of methyltributanoximesilane, and
  0.1 part by weight of dibutyltin dioctoate.

The composition was measured and evaluated in the same manner as in Example 1 in respect to the items indicated in Table 1. The results are given in Table 1.

Example 3

An organopolysiloxane composition was prepared by mixing under water-free conditions:
  100.0 parts by weight of a dimethylpolysiloxane terminated with a hydroxyl group at both terminal ends having a viscosity of 20,000 cSt,
  1.0 part by weight of $HO(Me_2SiO)_5$,
  10.0 parts by weight of a fumed silica having a specific surface area of 110 $m^2/g$ and the surface of which had been rendered hydrophobic by treatment,
  6.0 parts by weight of methyltributanoximesilane, and
  0.1 part by weight of dibutyltin dioctoate.

The composition was measured and evaluated in the same manner as in Example 1 in respect to the items indicated in Table 1. The results are given in Table 1.

Example 4

An organopolysiloxane composition was prepared by mixing under water-free conditions:
  100.0 parts by weight of a dimethylpolysiloxane terminated with a hydroxyl group at both terminal ends having a viscosity of 20,000 cSt,
  1.0 part of $Me_3SiO(Me(OH)SiO)_2SiMe_3$,
  10.0 parts by weight of a fumed silica having a specific surface area of 110 $M^2/g$ and the surface of which had been rendered hydrophobic by treatment,
  6.0 parts by weight of methyltributanoximesilane, and
  0.1 part by weight of dibutyltin dioctoate.

The composition was measured and evaluated in the same manner as in Example 1 in respect to the items indicated in Table 1. The results are given in Table 1.

Comparative Example 1

An organopolysiloxane composition was prepared by mixing under water-free conditions:
  100.0 parts by weight of a dimethylpolysiloxane terminated with a hydroxyl group at both terminal ends having a viscosity of 20,000 cSt, 10.0 parts by weight of a fumed silica having a specific surface area of 110 m²/g and the surface of which had been rendered hydrophobic by treatment, 6.0 parts by weight of methyltributanoximesilane, and 0.1 part by weight of dibutyltin dioctoate.

The composition was measured and evaluated in the same manner as in Example 1 in respect to the items indicated in Table 1. The results are given in Table 1.

Comparative Example 2

An organopolysiloxane composition was prepared by mixing under water-free conditions:

100.0 parts by weight of a dimethylpolysiloxane terminated with a hydroxyl group at both terminal ends having a viscosity of 20,000 cSt, 1.0 part by weight of $HO(Me_2SiO)_{15}H$, 10.0 parts by weight of a fumed silica having a specific surface area of 110 M²/g and the surface of which had been rendered hydrophobic by treatment, 6.0 parts by weight of methyltributanoximesilane, and 0.1 part by weight of dibutyltin dioctoate.

The composition was measured and evaluated in the same manner as in Example 1 in respect to the items indicated in Table 1. The results are given in Table 1.

TABLE 1

| | Examples | | | | Comparative Examples | |
|---|---|---|---|---|---|---|
| | 1 | 2 | 3 | 4 | 1 | 2 |
| Appearance | colorless | colorless | colorless | colorless | colorless | colorless |
| Slump (mm) | 0 | 0 | 0 | 0 | 5 | 2 |
| Stringing characterisitics (mm) | 33 | 30 | 27 | 39 | 110 | 70 |
| Time required before becoming tack-free (min) | 6 | 6 | 6 | 6 | 8 | 7 |
| Discharge rate (g/5 sec) | 48 | 32 | 40 | 39 | 32 | 40 |
| Tensile | | | | | | |
| Hardness | 35 | 35 | 36 | 35 | 32 | 36 |
| Elongation (%) | 400 | 350 | 400 | 380 | 250 | 310 |
| Tensile strength (Kgf/cm²) | 19 | 19 | 20 | 21 | 12 | 19 |

Example 5

An organopolysiloxane composition was prepared by mixing under water-free conditions:

100.0 parts by weight of a dimethylpolysiloxane terminated with a hydroxyl group at both terminal ends having a viscosity of 20,000 cSt, 1.0 part by weight of $HO(Me_2SiO)_5$, 8.0 parts by weight of a fumed silica having a specific surface area of 170 m²/g and the surface of which had been rendered hydrophobic by treatment, 6.0 parts by weight of vinyltributanoximesilane, and 0.1 part by weight of dibutyltin dioctoate.

The composition was measured and evaluated in the same manner as in Example 1 in respect to the items indicated in Table 2 except for not measuring discharge rate. The results are given in Table 2.

Example 6

An organopolysiloxane composition was prepared by mixing under water-free conditions:

100.0 parts by weight of a dimethylpolysiloxane terminated with a hydroxyl group at both terminal ends having a viscosity of 20,000 cSt, 1.0 part by weight of $HO(Me_2SiO)_5H$, 8.0 parts by weight of a fumed silica having a specific surface area of 170 m²/g and the surface of which had been rendered hydrophobic by treatment, 6.0 parts by weight of methyltriacetoxysilane, and 0.1 part by weight of dibutyltin dioctoate.

The composition was measured and evaluated in the same manner as in Example 1 in respect to the items indicated in Table 2 except for not measuring discharge rate. The results are given in Table 2.

Example 7

An organopolysiloxane composition was prepared by mixing under water-free conditions:

100.0 parts by weight of a dimethylpolysiloxane terminated with a hydroxyl group at both terminal ends having a viscosity of 20,000 cSt, 1.0 part by weight of $HO(Me_2SiO)_5H$, 8.0 parts by weight of a fumed silica having a specific surface area of 170 m²/g and the surface of which had been rendered hydrophobic by treatment, 6.0 parts by weight of vinyltriisopropenyloxysilane, and 0.5 part by weight of tetramethylguanidinopropyltrimethoxysilane.

The composition was measured and evaluated in the same manner as in Example 1 in respect to the items indicated in Table 2 except for not measuring discharge rate. The results are given in Table 2.

Example 8

An organopolysiloxane composition was prepared by mixing under water-free conditions:

100.0 parts by weight of a dimethylpolysiloxane terminated with a hydroxyl group at both terminal ends having a viscosity of 20,000 cSt, 1.0 part by weight of $HO(Me_2SiO)_5H$, 8.0 parts by weight of a fumed silica having a specific surface area of 170 m²/g and the surface of which had been rendered hydrophobic by treatment, 6.0 parts by weight of vinyltrimethoxysilane, and 1.0 part by weight of tetraisopropoxytitanium.

The composition was measured and evaluated in the same manner as in Example 1 in respect to the items indicated in Table 2 except for not measuring discharge rate. The results are given in Table 2.

Comparative Example 3

An organopolysiloxane composition was prepared by mixing under water-free conditions:

100.0 parts by weight of a dimethylpolysiloxane terminated with a hydroxyl group at both terminal ends having a viscosity of 20,000 cSt, 1.0 part by weight of polypropylene oxide terminated with a methyldiisopropenyloxy group at both terminal ends and having 4,000 cSt, 8.0 parts by weight of a fumed silica having a specific surface area of 170 m²/g and the surface of which had been rendered hydrophobic by treatment, 6.0 parts by weight of vinyltributanoximesilane, and 0.1 part by weight of dibutyltin dioctoate.

The composition was measured and evaluated in the same manner as in Example 1 in respect to the items indicated in Table 2 except for not measuring discharge rate. The results are given in Table 2.

TABLE 2

|  | Examples | | | | Comparative Examples |
| --- | --- | --- | --- | --- | --- |
|  | 5 | 6 | 7 | 8 | 3 |
| Appearance | colorless | colorless | colorless | colorless | colorless |
| Slump (mm) | 0 | 0 | 0 | 0 | 0 |
| Stringing characterisitics (mm) | 35 | 28 | 39 | 40 | 63 |
| Time required before becoming tack-free (min) | 8 | 5 | 2 | 2 | 8 |
| Hardness | 18 | 20 | 28 | 25 | 25 |
| Elongation (%) | 570 | 570 | 500 | 470 | 400 |
| Tensile strength (Kgf/cm²) | 21 | 16 | 18 | 17 | 18 |

Example 9

An organopolysiloxane composition was prepared by mixing under water-free conditions:

100.0 parts by weight of a dimethylpolysiloxane terminated with a hydroxyl group at both terminal ends having a viscosity of 20,000 cSt, 1.0 part by weight of $HO(Me_2SiO)_5H$, 10.0 parts by weight of a fumed silica having a specific surface area of 200 m²/g, 5.0 parts by weight of methyltributanoximesilane, 5.0 parts by weight of vinyltributanoximesilane, and 0.1 part by weight of dibutyltin dioctoate.

The composition was measured and evaluated in the same manner as in Example 1 in respect to the items indicated in Table 3 except for not measuring discharge rate. The results are given in Table 3.

Example 10

An organopolysiloxane composition was prepared by mixing under water-free conditions:

100.0 parts by weight of a dimethylpolysiloxane terminated with a hydroxyl group at both terminal ends having a viscosity of 20,000 cSt, 0.5 part by weight of $HO(Me_2SiO)_5H$, 0.5 part by weight of $Me_3SiO(Me(OH)SiO)_2SiMe_3$.

10.0 parts by weight of a fumed silica having a specific surface area of 200 m²/g, 5.0 parts by weight of methyltributanoximesilane, 5.0 parts by weight of vinyltributanoximesilane, and 0.1 part by weight of dibutyltin dilaurate.

The composition was measured and evaluated in the same manner as in Example 1 in respect to the items indicated in Table 3 except for not measuring discharge rate. The results are given in Table 3.

Comparative Example 4

An organopolysiloxane composition was prepared by mixing under water-free conditions:

100.0 parts by weight of a dimethylpolysiloxane terminated with a hydroxyl group at both terminal ends having a viscosity of 20,000 cSt, 10.0 parts by weight of a fumed silica having a specific surface area of 200 m²/g, 5.0 parts by weight of methyltributanoximesilane, 5.0 parts by weight of vinyltributanoximesilane, and 0.1 part by weight of dibutyltin dilaurate.

The composition was measured and evaluated in the same manner as in Example 1 in respect to the items indicated in Table 3 except for not measuring discharge rate. The results are given in Table 3.

Comparative Example 5

An organopolysiloxane composition was prepared by mixing under water-free conditions:

100.0 parts by weight of a dimethylpolysiloxane terminated with a hydroxyl group at both terminal ends having a viscosity of 20,000 cSt, 1.0 part by weight of polypropylene oxide terminated with a methyldiisopropenyloxy group at both terminal ends and having 4,000 cSt, 10.0 parts by weight of a fumed silica having a specific surface area of 200 m²/g, 5.0 parts by weight of methyltributanoximesilane, 5.0 parts by weight of vinyltributanoximesilane, and 0.1 part by weight of dibutyltin dilaurate.

The composition was measured and evaluated in the same manner as in Example 1 in respect to the items indicated in Table 3 except for not measuring discharge rate. The results are given in Table 3.

TABLE 3

|  | Examples | | Comparative Examples | |
| --- | --- | --- | --- | --- |
|  | 9 | 10 | 4 | 5 |
| Appearance | colorless | colorless | colorless | colorless |
| Slump (mm) | 0 | 0 | Dropped | Dropped |
| Stringing characterisitics (mm) | 58 | 62 | — | — |
| Time required before becoming tack-free (min) | 8 | 8 | 8 | 8 |
| Hardness | 30 | 30 | 33 | 32 |
| Elongation (%) | 430 | 420 | 280 | 320 |
| Tensile strength (Kgf/cm²) | 22 | 20 | 15 | 20 |

What is claimed is:

1. A room temperature curable organopolysiloxane composition comprising:

(A) a diorganopolisiloxane terminated with a hydroxyl group at both ends of its molecular chain having a viscosity of 25 to 1,000,000 cSt at 25° C., represented by the following general formula (1):

$$\text{HO(RR'SiO)}_P\text{H} \quad (1)$$

wherein R and R', which may be the same or different, are each a unsubstituted or substituted monovalent hydrocarbon group, and P is an integer of 10 or more;

(B) at least one compound selected from the group consisting of an organosilane or straight chain organosiloxane represented by the following general formula (2):

$$\text{HO}(R^1R^2\text{SiO})_L\text{H} \quad (2)$$

wherein $R^1$ and $R^2$, which may be the same or different, are each a unsubstituted or substituted monovalent hydrocarbon group, and L is an integer of 1 to 5, and a straight chain organosiloxane represented by the following general formula (3):

$$(R^3)_3\text{SiO}(R^1R^2\text{SiO})_M[R^1\text{Si(OH)O}]_N\text{Si}(R^3)_3 \quad (3)$$

wherein $R^1$ and $R^2$ are as defined above, $R^3$ is a unsubstituted or substituted monovalent hydrocarbon group, N is an integer of 2 to 5, and M is 0 or a positive integer provided that M+N equals to 2 to 5;

(C) a hydrolyzable silane represented by the following general formula (4):

$$(R^4)_A\text{SiX}_{(4-A)} \quad (4)$$

wherein $R^4$ is a unsubstituted or substituted monovalent hydrocarbon group, X is a hydrolyzable group, and A is 0 or 1; and (D) a silica filler having a specific surface area of 50 m$^2$/g or more.

2. The composition of claim 1, wherein in the component (A), R and R' in the formula (1) are each a unsubstituted or substituted monovalent hydrocarbon group having 1 to 10 carbon atoms, and P in said formula is an integer of 10 to 2,000.

3. The composition of claim 1, wherein in the component (B), the organosilane or straight chain organosiloxane of the formula (2) is at least one compound selected from the group consisting of dihydroxydimethylsilane, dihydroxymethylvinylsilane, dihydroxymethylphenylsilane, dihydroxymethyl-3,3,3-trifluoropropylsilane, dihydroxydiphenylsilane, 1,3-dihydroxytetramethyldisiloxane, 1,5-dihydroxyhexamethyltrisiloxane, 1,7-dihydroxyoctamethyltetrasiloxane, 1,9dihydroxydecamethylpentasiloxane, 1,3-dihydroxy-1,3-divinyl-1,3-dimethyldisiloxane and 1,5-dihydroxy-1,3,5-trivinyl-1,3,5-trimethyltrisiloxane, and the straight chain organosiloxane of the formula (3) is at least one compound selected from the group consisting of 2,3-dihydroxyoctamethyltetrasiloxane, 2,3-dihydroxy-2,3-divinylhexamethyltetrasiloxane and 2,3,4-trihydroxynonamethylpentasiloxane.

4. The composition of claim 1, wherein in the component (C), the hydrolyzable silane of the formula (4) is at least one compound selected from the group consisting of methyltriacetoxysilane, vinyltriacetoxysilane, methyltributanoximesilane, vinyltributanoximesilane, methyltrimethoxysilane, vinyltrimethoxysilane, vinyltriethoxysilane, ethyl 2-trimethoxysilylpropionate, 2-ethylhexyl 2-trimethoxysilylpropionate, 2-ethylhexyl 2-methyldimethoxysilylpropionate, vinyltriisopropenoxysilane, phenyltriisopropenoxysilane and methyltributylaminosilane.

5. The composition of claim 1, wherein the silica filler of the component (D) is at least one compound selected from the group consisting of hydrophilic silica and hydrophobic silica.

6. The composition of claim 1, wherein the silica filler of the component (D) has a specific surface area of 100 m$^2$/g or more.

7. The composition of claim 1, wherein the components (B), (C), and (D) are present in amounts of 0.1 to 10 parts by weight, 3 to 20 parts by weight, and 1 to 500 parts by weight, per 100 parts by weight of the component (A), respectively.

8. A sealing material comprising the room temperature curable composition of claim 1.

9. A cured product of the room temperature curable composition of claim 1.

* * * * *